United States Patent [19]

Gabler

[11] Patent Number: 4,479,670
[45] Date of Patent: Oct. 30, 1984

[54] WATER FLOW CONTROL VALVE

[75] Inventor: Dieter Gabler, Graben Neudorf, Fed. Rep. of Germany

[73] Assignee: Ranco Incorporated, Dublin, Ohio

[21] Appl. No.: 122,523

[22] Filed: Feb. 19, 1980

[51] Int. Cl.$^3$ .............................................. F16K 3/00
[52] U.S. Cl. .................................. 251/328; 251/174; 277/206 R
[58] Field of Search ............... 251/170, 171, 172, 174, 251/368, 328; 277/DIG. 1, 236, 206 R; 137/DIG. 4

[56] References Cited

U.S. PATENT DOCUMENTS

| | | | |
|---|---|---|---|
| 1,957,605 | 5/1934 | Lamont | 277/236 X |
| 2,291,801 | 8/1942 | Feucht | 277/206 X |
| 3,014,690 | 12/1961 | Boteler | 251/174 |
| 3,132,837 | 5/1964 | Britton | 251/174 X |
| 3,204,924 | 9/1965 | Bredtschneider | 251/174 |
| 3,217,922 | 11/1965 | Glasgow | 277/206 X |
| 3,871,616 | 3/1975 | Taylor | 251/368 X |
| 4,099,705 | 7/1978 | Runyan | 251/171 |
| 4,196,886 | 4/1980 | Murray | 251/368 X |

FOREIGN PATENT DOCUMENTS 1046229  7/1953  France ................................. 251/170

Primary Examiner—Harold W. Weakley
Attorney, Agent, or Firm—Watts, Hoffmann, Fisher & Heinke

[57] ABSTRACT

A water flow control valve has a ceramic shutter plate which is slidable relative to a pressure member having a flat face against which the shutter plate slides. The pressure member is urged against the shutter plate by a tubular resilient sealing element which is subjected to axial compression to produce barrel deformation.

10 Claims, 5 Drawing Figures

U.S. Patent  Oct. 30, 1984  Sheet 1 of 3  4,479,670
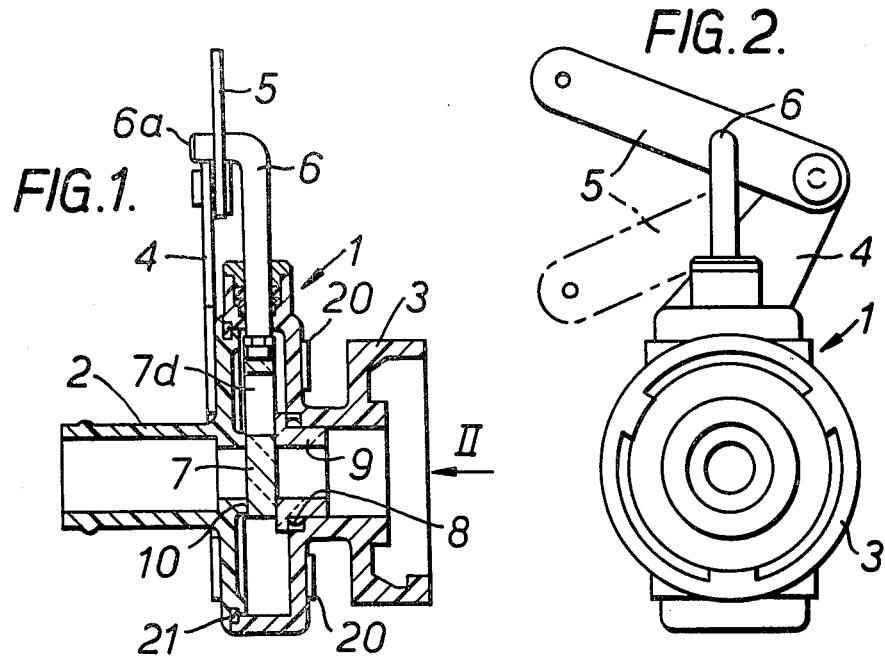
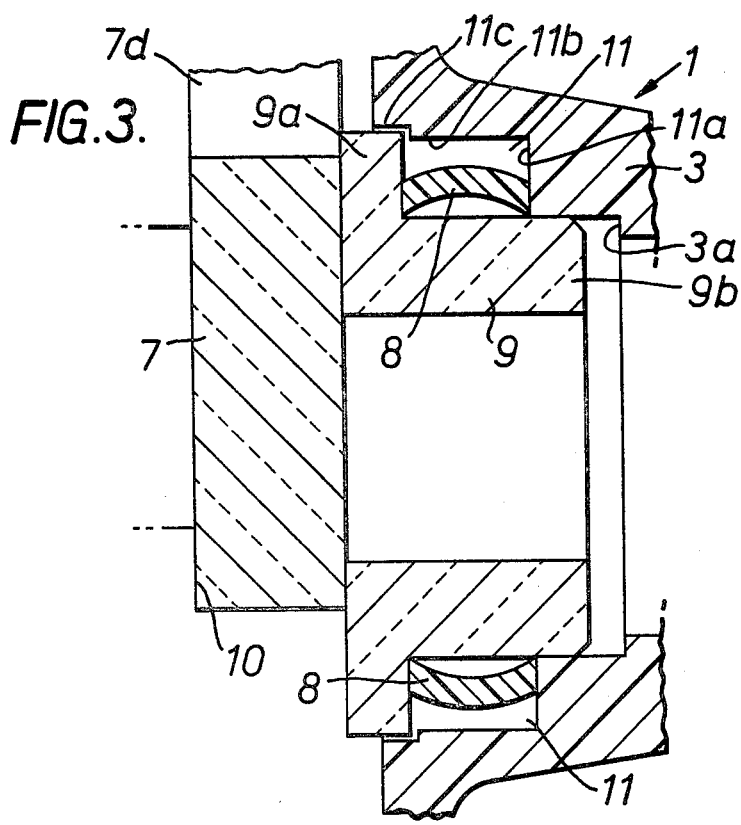

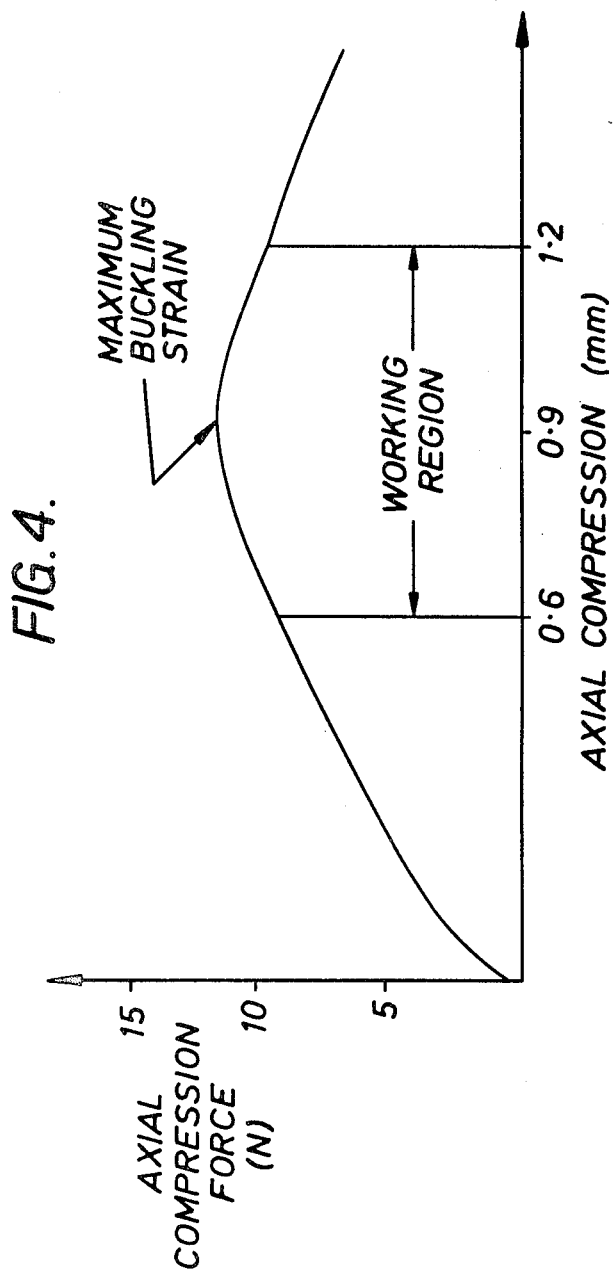

WATER FLOW CONTROL VALVE

WATER FLOW CONTROL VALVE

This invention relates to a valve for controlling the flow of water in vehicles. More particularly the invention concerns a valve as aforesaid comprising a housing having inlet and outlet connections and a plate-like valve slider having a flow opening, the valve slider being movable between an open position in which water can flow through the flow opening from the inlet to the outlet connection and a closed position in which the flow opening is cut off from the inlet and outlet connections.

Such valves serve to regulate the flow of engine cooling water through a heat exchanger which forms part of an interior heater of the vehicle. The valves as presently used in water circuits of vehicle heaters are provided with seals for the valve slider of soft rubber or a plastics. It is not uncommon for sand or grit to become embedded in the soft rubber or plastics seals, causing abrasions in the cooperating metal sealing surfaces. This in turn can cause leaking of the valve, and a loss of precision in the regulation of small water flows by the valve.

The object of the present invention is to provide a flow control valve as aforesaid which is capable of operation with sustained precision over a longer period of time, particularly for smaller water flows, than previously known valves, and which is of low manufacturing cost.

According to the invention there is provided a water flow control valve comprising a housing having water inlet and outlet connections and a plate-like valve shutter having a flow opening, the valve shutter being movable between an open position in which water can flow through the flow opening from the inlet to the outlet connection and a closed position in which the flow opening is cut off from the inlet and outlet connections, characterised in that the valve is sealed internally by a tubular resiliently flexible sealing element which is subjected to a barrel-deformation between the housing and a pressure member relative to which the valve shutter slides, urging the pressure member against the valve shutter while sealing the said pressure member relative to the housing.

In practice both the pressure member and the valve shutter should ideally be of a hard material such as ceramic material. Any foundry sand in the water flow circuit or coolant passages of the vehicle engine does not abrade the sealing surfaces of the slider and the pressure member. The pressure member is sealed relative to the housing by the sealing element, the barrel-deformation of which serves to press the pressure member against the valve shutter.

The tubular sealing element preferably assumes a deformed shape such that its resilient spring-biasing force is a maximum. If, therefore, due to manufacturing tolerances the dimensions of the valve fluctuate, the spring force exerted by the sealing element on the pressure member, and therefore by the pressure member against the valve shutter, will remain substantially constant. This allows a relatively large tolerance in the thickness of the valve shutter and the pressure member, which is particularly useful where these components are fabricated in ceramic material. This is in practice advantageous compared with the use of a compression spring to urge the pressure member into sealing contact with the valve slider, where variations in the dimensions of the valve components due to manufacturing tolerances could give rise to a variation in the spring load and, therefore in the valve operating force as between one valve and another.

Preferably the sealing element is located in a recess which has a diameter such that the deformed sealing element does not touch the wall of the recess. This arrangement allows the sealing element to bend in the middle without touching the wall of the recess, so that after passing its maximum spring force, the spring force exerted by the element falls off.

Experience has shown that a sealing element of plastics having the following dimensions has proved most suitable: internal diameter 14 mm, thickness 1 mm, length 5.1 mm arranged in a recess with an external diameter of at least 19 mm.

In order to retain the tubular sealing element in the recess, the pressure member may comprise a tubular bush having a radial flange one face of which is in sliding contact with the valve shutter and the opposite face of which is engaged by the tubular sealing element. Preferably the flange has an outer diameter corresponding to the outer diameter of the recess housing the sealing element, and the bush has an outer diameter corresponding to the inner diameter of the said recess. In an alternative embodiment the pressure member comprises a flat annular plate which is seated in a recess in the valve housing.

The invention will be further described, by way of example, with reference to the accompanying drawings, in which:

FIG. 1 is an axial section of a water flow control valve according to one embodiment of the invention;

FIG. 2 is an end view of the valve in the direction of arrow II in FIG. 1;

FIG. 3 is an enlarged view of a detail of FIG. 1;

FIG. 4 shows graphically the buckling force/axial compression characteristic curve of the resilient sealing element of the valve shown in FIGS. 1 to 3.

Figure 5:
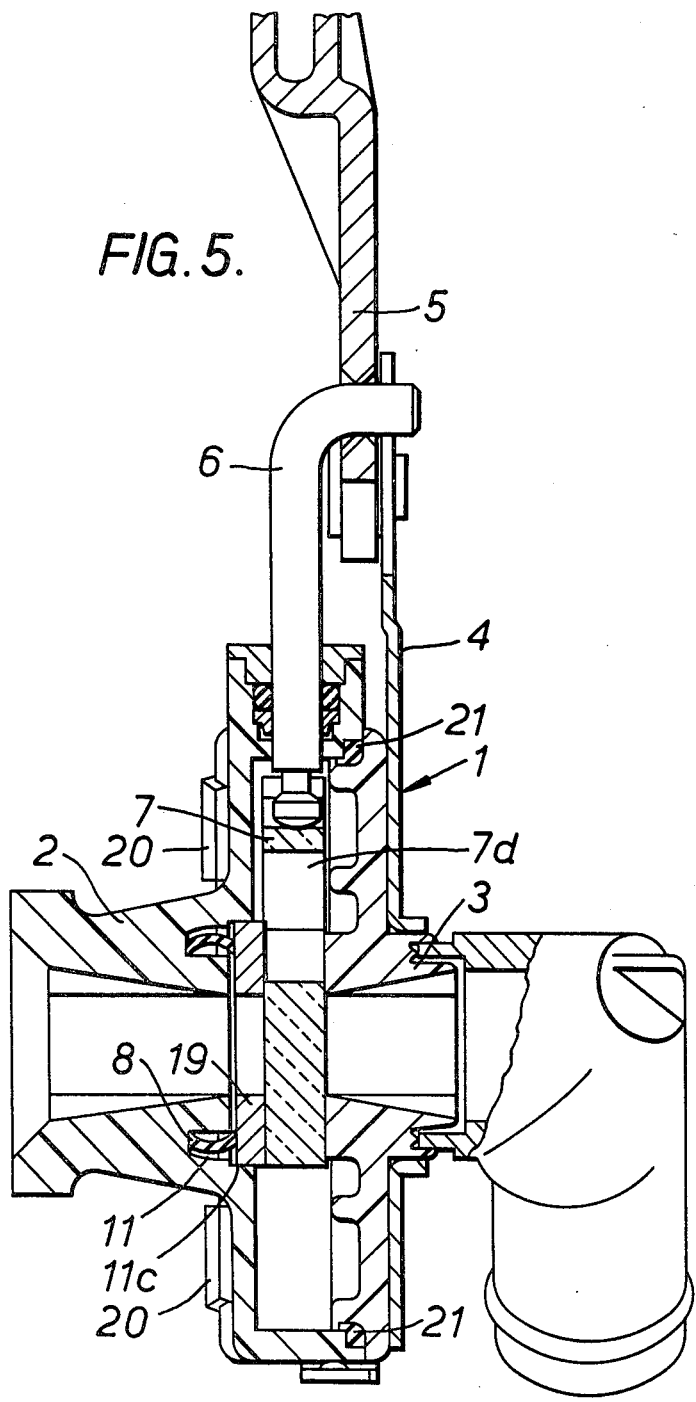
FIG. 5 is an axial section of a water control valve according to another embodiment of the invention, parts corresponding to those of the embodiment of FIGS. 1 to 3 being designated by the same reference numerals.

Referring to FIGS. 1 to 3, the valve has a housing 1 provided with inlet and outlet connections 2, 3 suitable for hose connections. The housing 1 may be moulded in plastics material. Mounted on the housing is a bracket 4 on which a control lever 5 is pivotally mounted. A valve operating rod 6 has an end portion 6a which is bent at right angles and engages in a hole in the control lever 5, enabling the latter to effect displacement of the rod 6. The rod 6 passes through a seal into the interior of the housing 1 and is connected within the housing to a displaceable ceramic shutter plate 7. The shutter plate 7 is pressed against a flat annular shoulder 10 on the inlet side of the housing 1 by means of a sealing device which consists of a tubular sealing element 8 of silicone rubber and a pressure member comprising a ceramic tubular bush 9. The surfaces of contact of the components 7, 9 and 10 are ground or finished flat by other means so that the flow of water between the connections 2 and 3 can be effectively cut off. The ceramic shutter plate 7 is provided with a funnel-shaped opening 7d which has its widest part near the operating rod 6 and tapers to a narrow slit remote from the rod 6.

By turning the control lever 5, the rod 6 displaces the shutter 7 within the housing 1 between a closed position, shown in FIG. 1, in which the opening 7d is cut off from the inlet and outlet connections 2, 3 and a fully open position in which the opening 7d is coaxially aligned with the inlet and outlet connections for maximum water flow. As the shutter 7 is moved towards the open position the opening 7d moves progressively into the flow channel between the inlet and outlet connections 2, 3, progressively increasing the water flow through the valve.

FIG. 3 shows the sealing device more clearly. The housing 1 is formed with an annular recess 11 in which the tubular sealing element 8 is located. The recess 11 has a radial end wall 11a and a cylindrical axial wall 11b. The recess 11 has a widened mouth defined by a cylindrical wall 11c. The bush 9 has a flange 9a and a tubular guide portion 9b which defines an inner cylindrical wall of the recess 11, thereby enclosing the sealing element 8.

As can be seen the sealing element 8 is prestressed upon the assembly of the valve with a barrel deformation which results from the shape of the tubular sealing element and the adjoining surfaces of the recess 11. The recess 11 is sufficiently wide in a radial direction to permit maximum arching of the sealing ring 8 without coming into contact with the cylindrical wall 11b.

FIG. 4 illustrates diagrammatically the spring characteristic of the resilient sealing element 8, in a typical example. Up to an axial compression of about 0.6 mm the buckling-force/compression characteristic increases substantially linearly and then flattens out at a maximum stress with an axial compression of about 0.9 mm, after which the spring stress falls off with further increasing compression. In the region between compressions of 0.6 and 1.2 mm the characteristic is substantially flat, corresponding to only a small increase- or decrease of stress or spring force over this range of axial compression. The region between 0.6 and 1.2 mm is used as the prestress- or working region of the sealing element 8, ensuring that the biasing force with which the flange 9a of the bush 9 is urged into sealing contact with the shutter plate 7, and the shutter plate 7 into sealing contact with the shoulder 10, is substantially constant, even if, due to manufacturing tolerances, the axial dimensions of these parts should fluctuate within a range of approximately 0.6 mm.

In a typical practical example, the internal diameter of the tubular sealing element 8 is 14 mm, its thickness is 1 mm and its undeformed length is 5.1 mm. The outer diameter of the flange 9a, and of the cylindrical wall 11c should then be 19 mm. In order to simplify assembly the internal diameter of the sealing element 8 may be 0.2 mm less than the external diameter of the guide portion 9b ensuring that the sealing element 8 is retained elastically on the guide portion 9b.

In the example described in the preceding paragraph, the sealing element 8 has an internal diameter in its unstressed state of 14 mm. If the guide portion 9b were to have an outer diameter of 15 mm, this would mean that the sealing element 8 would be radially prestressed upon fitting to the guide portion 9b, and in consequence the stress-deflection curve would reach a higher maximum value, with the possibility of the radially outwardly bulging element 8 coming into contact with the cylindrical wall 11b. This also applies if the sealing element 8 is too thick.

As shown in FIG. 3 axial displacement of the bush 9 relative to the housing 1 can be limited by the compression of the tubular sealing element 8 or by engagement of the flange 9a with the annular shoulder which interconnects the cylindrical walls 11b and 11c of the recess 11.

As can be seen in FIG. 1, the housing 1 is made in two parts which are provided with the respective inlet and outlet connections 2, 3. This allows easy access to the flat sealing surface of the shoulder 10 and the recess 11 upon disassembly of the valve. The shape or form of the housing 1 and of the connections 2, 3 can be adapted to suit the special needs of a user. It will also be appreciated that the rod 6 may be operated by other means than the lever 5 illustrated, for example, by pneumatic actuator means.

The embodiment of FIG. 5 is essentially similar to that of FIGS. 1 to 3, except that the bush 9 of the embodiment of FIGS. 1 to 3 is replaced by an annular pressure plate 19 housed in the shallow cavity defined by the cylindrical wall 11c of the recess 11. The pressure plate 19 and the cooperating valve shutter 7 are both of ceramic material.

In the embodiment of FIG. 5 the water flow passages in the inlet and outlet connections 2, 3 taper in flow cross section to a minimum coinciding with the circular through hole of the annular pressure plate 19.

In both the illustrated embodiments of the invention the construction and assembly of the valve is simplified by forming the valve housing 1 in two parts provided respectively with the inlet and outlet connections 2, 3 and held together by the clinching of four deformable legs 20 (two only of which are visible) formed integrally with the mounting bracket 4, which is preferably fabricated in zinc-plated cold-rolled steel. A sealing ring 21 between the two parts provides a watertight seal upon assembly of the housing 1.

I claim:
1. A water flow control valve comprising:
  a housing having water inlet and outlet connections;
  a plate-like valve shutter having a flow opening;
  valve operating means for displacing the valve shutter between an open position in which water can flow through the flow opening from the inlet to the outlet connection and a closed position in which the flow opening is cut off from the inlet and outlet connections;
  a pressure member within said housing relative to which the valve shutter slides, and
  a tubular resiliently flexible sealing element located within the housing and subjected to an axial deforming force between the housing and said pressure member, to produce elastic deformation of the sealing element with an outwardly-bowed shape in axial section, said deformed sealing element urging the pressure member against the valve shutter while sealing the said pressure member relative to the housing.

2. The valve defined in claim 1, wherein the housing has a recess having a cylindrical wall within which the sealing element is located, said recess having a diameter such that the deformed sealing element is spaced from said cylindrical wall.

3. The valve defined in claim 1 or claim 2, wherein the tubular sealing element has a length and thickness such that in its deformed condition it exerts a maximum biasing force on the pressure member.

4. The valve defined in claim 1, wherein said pressure member comprises a tubular bush provided with a radial flange having one face which is in sliding contact with the valve shutter and an opposite face which is engaged by said tubular sealing element.

5. The valve defined in claim 1, wherein the pressure member comprises a flat annular plate and the housing has a recess within which said annular plate is seated.

6. The valve defined in claim 1, claim 4 or claim 5, wherein the plate-like valve shutter is made of ceramic material.

7. The valve defined in claim 1, claim 4 or claim 5, in which the pressure member is made of ceramic material.

8. The valve defined in claim 1 or claim 5, wherein the valve housing has inlet and outlet flow passages which taper in cross section towards the valve shutter.

9. The valve claimed in claim 1 wherein said housing defines a pressure member receiving recess with said pressure member supported for limited axial movement therein relative to said housing, said tubular element extending axially between said pressure member and said housing and urging said pressure member in a direction away from said recess.

10. The valve claimed in claim 9 wherein said tubular element is formed by a substantially cylindrical element wall having one end portion in sealing engagement with said pressure member and an opposite end portion in sealing engagement with said housing, said element wall defining a medial section between said end portion which is bowed radially outwardly relative to said end portions and resiliently urging said end portions away from each other, said medial section spaced radially from said housing and said pressure member.

* * * * *